United States Patent [19]

Keller et al.

[11] 4,223,123
[45] Sep. 16, 1980

[54] ALIPHATIC PHENOXY POLYPHTHALOCYANINE

[75] Inventors: Teddy M. Keller, Alexandria, Va.; James R. Griffith, Riverdale Heights, Md.

[73] Assignee: The United States of America as represented by the Secretary of the Navy, Washington, D.C.

[21] Appl. No.: 43,188

[22] Filed: May 29, 1979

[51] Int. Cl.³ .................... C08G 73/00; C08G 79/00; C08G 79/12

[52] U.S. Cl. .................... 528/210; 260/465 F; 260/465 H; 528/9; 528/166; 528/206; 528/271

[58] Field of Search ............. 528/9, 166, 206, 210, 528/271; 200/465 F, 465 H

[56] References Cited

U.S. PATENT DOCUMENTS

| | | | |
|---|---|---|---|
| 3,926,629 | 12/1975 | Weigl | 528/9 |
| 4,056,560 | 11/1977 | Griffith et al. | 260/465 D |
| 4,057,569 | 11/1977 | Griffith et al. | 260/465 E |
| 4,136,107 | 1/1978 | Griffith et al. | 260/465 E |

Primary Examiner—Lester L. Lee
Attorney, Agent, or Firm—R. S. Sciascia; Philip Schneider; Thomas McDonnell

[57] ABSTRACT

Polyphthalocyanine resins are obtained by heating, at a temperature from about 260° C. to about 295° C., one or more bisorthodinitriles of the general formula:

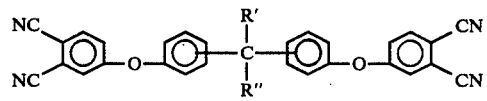

wherein R' is an alkyl radical with 1 to 6 carbon atoms, R" is hydrogen or an alkyl radical with 1 to 6 carbon atoms, and the phenyl groups are attached at the meta or para position. These resins are particularly useful in high-temperature structural composites.

10 Claims, No Drawings

ALIPHATIC PHENOXY POLYPHTHALOCYANINE

BACKGROUND OF THE INVENTION

The present invention pertains generally to high-temperature resins and in particular to cyano-addition resins from oxyarylbisorthodinitriles.

It is known that certain bisorthodinitriles polymerize to form strong, high-temperature thermosetting resins. Examples of bisorthodinitriles suitable for producing these resins are disclosed in U.S. Pat. Nos. 4,056,560; 4,057,569; 4,116,945; and 4,136,107 by James R. Griffith and Jacque G. O'Rear.

The structure of these resins is not completely known. For the following reasons, the principal mechanism of formation is theorized to be phthalocyanine nucleation. As the bisorthodinitriles polymerize, the color becomes progressively darker green in the manner similar to phthalocyanines. The polymerization is difficult to initiate and promote which indicates the formation of a large and complex nucleus such as the phthalocyanine nucleus by a large end group such as the phthalonitrile group.

The resins have properties that make them exceptionally suitable for structural resins. They have a maximum temperature stability in an oxygen-containing atmosphere of about 230° C. which represents a significant improvement over epoxy resins. Water resistance as measured by the water-soak method is better than that for epoxy resins.

The structural strength of the resins is comparable to that of epoxy and polyimide resins. These resins have many advantages over polyimides due to the absence of solvents, being less hydroscopic, and not being thermoplastic with a low glass transition temperature. Thus polyphthalocyanine resins promise to be an important new class of structural resins.

Although the properties of these resins are excellent, many applications require resins which have a higher temperature stability, a greater resistance to oxidative or chemical attack, lower combustibility and higher char content and are self extinguishing. Of course, a reduction in cost is always of great importance.

SUMMARY OF THE INVENTION

It is therefore an object of the present invention to provide a polyphthalocyanine resin having a water repellancy greater than existing polyphthalocyanine resins without fluorine atoms.

Another object is to provide a resin which is thermally stable in an oxidative atmosphere at a temperature up to about 300° C.

Yet another object of this invention is to provide a resin which is self-extinguishing and gives a high char yield upon burning.

A further object of this invention is to provide a resin which is more resistant to oxidative attack than epoxies and polyphthalocyanine resins prepared from amide-bridged bisorthodinitriles.

A still further object of this invention is to provide a resin which does not require a solvent system for its preparation and does not require a multicomponent system for preparation.

These and other objects are achieved by heating a bisorthodinitrile in which the terminal phthalonitrile moieties are interconnected by a nonterminal- or mono-terminal-aliphatic phenoxy bridge at a temperature from 260° C. to 295° C.

DETAILED DESCRIPTION OF THE INVENTION

As the resins of this invention are formed, the green color becomes progressively darker in the same manner phthalocyanines and polyphthalocyanines. The polymerization is difficult to initiate and to promote. It is on this basis that the phthalocyanine formation reaction is believed to be the principal reaction. Other cyano-addition reactions may also be present; however, the resulting resin is a three-dimensional network polymer with exceptional uniformity in properties.

The resin with phthalocyanine nuclei has a structural formula:

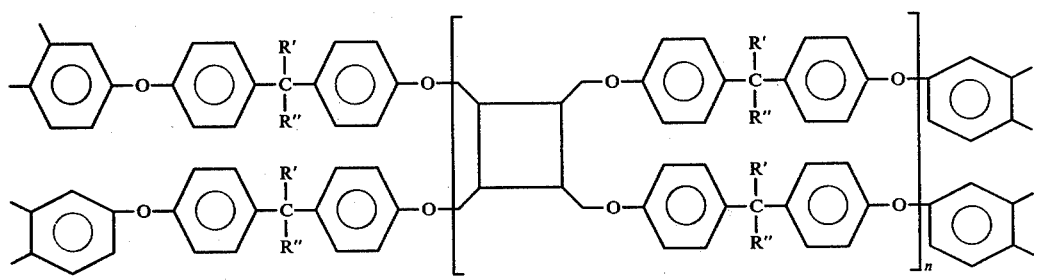

wherein n is any number; R' is a straight or branched alkyl radical with 1 to 6 carbon atoms, R" is hydrogen or a straight or branched alkyl radical with 1 to 6 carbon atoms, the phenyl groups are attached at the meta or para position and

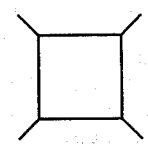

represents a phthalocyanine nucleus which has the formula:

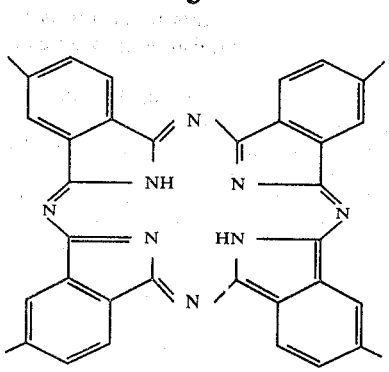

If the phthalocyanine has been coordinated by a metal or salt, the phthalocyanine nucleus is represented by:

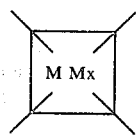

and the formula is:

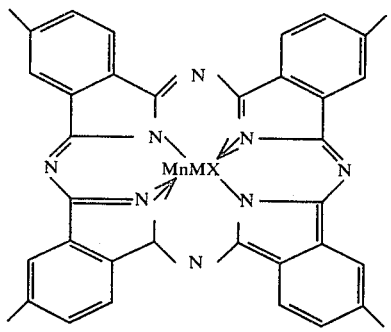

wherein M is a metal and MX is a metallic salt. Hereinafter, the resins of this invention are designated as: $(PcO_4(CR'R'')_2Ph_4)_n$ if neat as $(M.PcO_4(CR'R'')_2Ph_4)_n$ if coordinated with a metal, and as $(MX.PcO_4(CR'R'')_2Ph_4)_n$ if coordinated with a metallic salt.

The preferred spacer (CR'R'') between the phenoxy moieties is 2,2-propyl which is represented by the above formula when R' and R'' are methyl groups. The primary advantage of this spacer over the other spacers is the low cost of preparing the bisorthodinitrile without any loss of properties in the resin.

The preferred metals are copper, iron, zinc, and nickel on account of their enhancement of thermal stability over other metals at temperatures in excess of 250° C. Examples of other metals which may be used are chromium, molybdenum, vanadium, beryllium, silver, mercury, tin, lead, antimony, calcium, barium, manganese, magnesium, cobalt, palladium, and platinum. The preferred metallic salt is stannous chloride. This salt increases the reaction rate more than metals or other salts and has the least trouble with poor dispersion and voids caused by entrapped gas. These advantages occur only if the stannous chloride is dispersed by the method described hereinafter. Other suitable metallic salts include cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous flouride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof. Additional examples of metals and salts are found in Mosher, Frank H. and Thomas, Arthur L., *Phthalocyanine Compounds.* N.Y. Reinhold, 1963 p. 104–141.

The resins of the present invention are obtained by heating a bisorthodinitrile of the general formula:

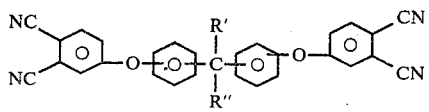

where R' is a straight or branched alkyl with 1 to 6 carbon atoms, R'' is hydrogen or a straight or branched alkyl with 1 to 6 carbon atoms, and the phenyl groups are attached at the meta or para position. These bisorthodinitriles are prepared by a nucleophilic substitution of the nitrosubstituent, which has been activated by cyano groups on the aromatic ring of 4-nitrophthalonitrile, with an aliphatic phenoxy bisphenol. The reaction is shown by the following schematic:

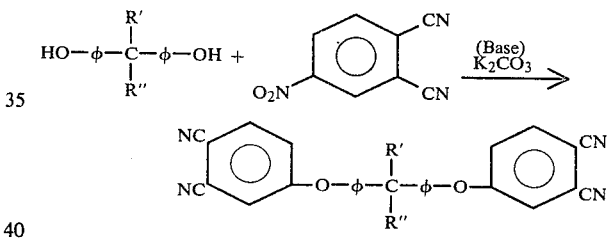

The bisphenol can be easily prepared by reacting phenol with the appropriate ketone in the presence of a Lewis acid, e.g., $AlCl_3$. It is the low cost of bisphenol-A which is prepared from acetone and phenol that makes the resin prepared from the bisorthodinitrile with the spacer

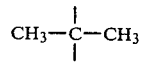

inexpensive.

The difficulty of initiating and promoting the neat polymerization of the bisorthodinitriles to obtain the resins of the present invention is greater than the considerable difficulty of polymerizing the previously used bisorthodinitriles. Due to the unreactivity of these bisorthodinitriles, it is necessary to heat them to about the decomposition temperature of the resulting resin. Amide-bridged polyphthalocyanine resins could be formed at the melting point of the bisorthodinitriles but the bisorthodinitriles required to produce the present resins are virtually unreactive at their melting points. Consequently, the bisorthodinitriles must be heated to a temperature from about 260° C. to about 295° C. in order to have the polymerization completed within a reasonable time. The atmosphere can be oxygen-containing, inert, or a vacuum. The heating is continued until the melt solidifies to an extremely hard material. The preferred method of preparation comprises heating a phthalonitrile to about 200° C. and then slowly raising the temperature to about 240° C. to about 265° C. After the melt, the viscosity starts to increase due to the onset of the phthalocyanine formation which is called the B-stage. At the B-stage, the material can be cooled to a frangible solid and can be stored indefinitely without further reaction. The C-stage is obtained from the B-stage resin by breaking up the B-stage resin and heating the resin at a temperature from 260° C. to 295° C. The preferred temperature for reacting the resin to the C-stage is from 260° C. to 295° C. and the most preferred is from 270° C. to 290° C. The optimum cure for any particular resin at a particular temperature is determined empirically by testing the structural strength of samples over a range of cure times.

In adding a metal or salt to co-ordinate the phthalocyanine nuclei, the metal or salt is added in a stoichiometric amount while the tetranitrile is molten or powdered. If the amount of the metal or salt is less than stoichiometric, i.e., less than one equivalent per two equivalents of the phthalonitrile, the resulting resin is not completely coordinated with a salt or metal. An amount in excess of stoichiometry would cause the resin to have unreacted metal or salt in it. Avoiding the presence of any unreacted salt or metal is particularly important with the synthesis of the present resins on account of the high temperatures needed for polymerization.

High temperatures further require a high degree of purity on account of the increased reactivity of all species present including the impurities. For example, metal oxides at temperatures above 280° C. can attack the benzene-ring structure. The preferred amounts of impurities are less than 100 ppm. Impurities can be present in amounts up to 300 ppm without noticeably affecting the quality of the final resin.

As with previous polyphthalocyanine resins, the dispersion of the salt or metal is affected by the particle size. Since the resin is formed at such high temperatures, dispersion becomes particularly critical. Consequently, particle sizes up to 1000 micrometers are preferred.

If stannous chloride is used to co-ordinate the resin, the stannous chloride must be introduced into the melt as stannous chloride dihydrate by the following method. The stannous chloride dihydrate ($SnCl_2.2H_2O$) is introduced either as a melt or powder. If the bisorthodinitrile is a powder, the mixture is heated, while being stirred, to a temperature from the melting point to about 20° C. in excess thereof until all water is expelled from the mixture; and if the phthalonitrile is molten, then the mixture is kept at the melt temperature until all water is expelled. The mixture is then reacted either to the B-stage or C-stage in the manner previously described.

The effect of including a metal or salt is the promotion of the polymerization. Inclusion of a salt or metal permits a 10° to 20° C. reduction in the polymerization temperatures without affecting the reaction rate or causes the reaction to significantly speed up at any given temperature. This promotion effect is especially present with the inclusion of stannous chloride. With that salt the polymerization temperatures can be reduced by about 40° C.

Examples of the preparation of the bisorthodinitriles and polyphthalocyanines of the invention are herein given. These examples are given by way of explanation and are not meant to limit the disclosure or the claims to follow in any manner.

EXAMPLE I

A. Preparation of Bis(3,4-dicyanophenyl) ether of Bisphenol A

To a three-necked, 1-liter flask was added 125 g (0.55 mol) of bisphenol A, 275 g (2.0 mol) of anhydrous potassium carbonate, 190 g (1.10 mol) of 4-nitrophthalonitrile and 900 ml of dry dimethyl sulfoxide. The resulting mixture was stirred at 55°–60° C. for four hours under a nitrogen atmosphere. After cooling, the product mixture was slowly poured into 2000 ml of cold dilute hydrochloric acid solution. The precipitate which separated was isolated by suction filtration and washed with water until neutral. The crude, dried product was pulverized and washed thoroughly with hot absolute ethanol which removed the impurities. The pure product, 230 g, 87%, m.p. 196°–199° C., being insoluble in ethanol was collected and identified as the above compound by infrared, NMR and elemental analysis.

EXAMPLE II

A mixture of 10 g (44 mmol) of bisphenol A, 3.6 g (90 mmol) of sodium hydroxide, 4 ml of water, 70 ml of dimethyl sulfoxide and 10 ml of benzene was stirred for 3 hours at reflux under a nitrogen atmosphere and the water was azeotrope from the mixture with a Dean-Stark trap. After cooling, 15.7 g (91 mmol) of 4-nitrophthalonitrile were added in one portion and the resulting mixture was stirred at room temperature overnight. The mixture was then poured into 300 ml of cold water. The white solid which separated was collected by suction filtration, washed with water, dried and washed with hot absolute ethanol to yield 20.7 g (98%) of the desired product, m.p. 196°–199° C.

B. Polymerization of Bisorthodinitriles-Polymerization of Bis(3,4-Dicyanophenyl) ether of Bisphenol A.

EXAMPLE III

The monomer (1.6 g, 3.3 mmol) was placed in a planchet and heated at 240° C. for 6 days. The melt had turned green but had not gelled which indicated that polymerization was occurring very slowly. The temperature was increased to 280° C. and solidification had occurred after 3 days at this temperature. The sample was postcured at 280° C. for 3 additional days.

EXAMPLE IV

The monomer (1.5 g, 3.1 mmol) and 0.34 g (1.5 mmol) of stannous chloride dihydrate were mixed and placed in a planchet. The sample was placed on a hot plate at 200° C. Almost immediately, the melt turned green and the stannous chloride dihydrate dissolved. After five minutes the sample was very viscous and solidified shortly thereafter. The sample was heated at 220° C. for 18 hours and was postcured at 250° C. for twenty-two hours.

EXAMPLE V

The monomer (1.7 g, 3.5 mmol), 0.063 g (0.96 meq) of zinc and a few crystals of iodine to activate the surface of the zinc were added to a test tube. The sample was melted and stirred while slowly increasing the temperature to 260° C. After thirty minutes at 260° C., the zinc had dissolved and the reaction medium was quenched with dry ice. The contents were then removed from the test tube, placed in a planchet and heated at 280° C. for 66 hours. After 36 hours at 280° C., the sample had solidified into an extremely hard solid.

Polymerization occurs by a cyclic addition reaction without formation of volatile by-products to produce a solid, void-free product. The polymers from Example III to V show high thermal and oxidative stability for an extended period. Heating the polymers for 100 days at 280° C. caused only a five percent weight loss. Exposure and removal of samples of these polymers from a high-temperature flame demonstrated that these polymers are self-extinguishing. The polymers containing no polar units, show a maximum absorption of 1.3% water during a water-soak test. Preliminary tests indicate that the polymers have a high elastic module which is ideal for the manufacture of fiber-reinforced composite materials for aircraft structures.

The weight reduction and cost effectiveness of graphite composite materials are increasing their use in civilian and military aircraft and other vehicles. Presently, epoxies and polyimides are being used, but each has numerous disadvantages. For example, conventional epoxy-based composites which are presently being tested in aircraft structures are limited to 121° C. (250° F.) maximum service temperature. Other problems associated with these polymers include their brittleness, behavior in the presence of moisture, and engineering reliability. The polyphthalocyanines of this invention provide a new matrix resin for composites with long-term operational capability in excess of 250° C. (450° F.), with insensitivity to high humidity, and with the ability to retain reinforcing fibers during or following exposure to a fire environment.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A thermosetting resin comprising a polyphthalocyanine having a repeating unit selected from the class consisting of $PcO_4(CR'R'')_2Ph_4$, $M.PcO_4(CR'R'')_2Ph_4$, and $(MX.PcO_4(CR'R'')_2Ph_4$ wherein Pc represents the phthalocyanine nucleus, Ph represents the phenyl group, M represents a metal selected from the class consisting of copper, magnesium, zinc, iron, cobalt, nickel, palladium, platinum, manganese, chromium, molybdenum, vanadium, beryllium, silver, mercury, aluminum, tin, antimony, calcium, barium, cadmium, and mixtures thereof, MX represents a metal salt selected from the class consisting of stannous chloride, cuprous chloride, cuprous bromide, cuprous cyanide, cuprous ferricyanide, zinc chloride, zinc bromide, zinc iodide, zinc cyanide, zinc ferricyanide, zinc acetate, zinc sulfide, ferrous chloride, ferric chloride, ferrous ferricyanide, ferrous chloroplatinate, ferrous fluoride, ferrous sulfate, cobaltous chloride, cobaltic sulfate, cobaltous cyanide, nickel cyanide, nickel carbonate, stannic chloride and mixtures thereof, R' represents an alkyl radical with 1 to 6 carbon atoms, R'' represents hydrogen or an alkyl radical with 1 to 6 carbon atoms, and the phenyl groups are attached at the meta or para position.

2. The resin of claim 1 wherein said phenyl groups are attached at the para position.

3. The resin of claim 2 wherein said polyphthalocyanine has said repeating unit $PcO_4(CR'R'')_2Ph_4$.

4. The resin of claim 3 wherein R' and R'' are methyls.

5. The resin of claim 2 wherein said polyphthalocyanine has said repeating unit $M.PcO_4(CR'R'')_2Ph_4$.

6. The resin of claim 5 wherein R' and R'' are methyls.

7. The resin of claim 6 wherein M is selected from the class consisting of silver, copper, nickel and iron.

8. The resin of claim 2 wherein said polyphthalocyanine has the repeating unit of $MX.PcO_4(CR'R'')_2Ph_4$.

9. The resin of claim 8 wherein R' and R'' are methyls.

10. The resin of claim 9 wherein MX is stannous chloride.

* * * * *